United States Patent [19]

Shamp et al.

[11] Patent Number: 5,643,348
[45] Date of Patent: Jul. 1, 1997

[54] OXYGEN/FUEL FIRED FURNACES HAVING MASSIVE, LOW VELOCITY, TURBULENT FLAME CLOUDS

[75] Inventors: Donald Ellsworth Shamp, Millbury, Ohio; Thomas Fowler Stark, Littleton, Colo.; Harry Earl Swisher, Jr., Parkersburg, W. Va.

[73] Assignee: Schuller International, Inc., Denver, Colo.

[21] Appl. No.: 376,569

[22] Filed: Jan. 23, 1995

Related U.S. Application Data

[60] Continuation-in-part of Ser. No. 167,752, Dec. 15, 1993, abandoned, which is a division of Ser. No. 15,491, Feb. 9, 1993, Pat. No. 5,346,524, which is a continuation-in-part of Ser. No. 944,551, Sep. 14, 1992, abandoned.

[51] Int. Cl.$^6$ ............................................. C03B 5/04
[52] U.S. Cl. .................. 65/134.4; 65/346; 65/347; 432/196
[58] Field of Search .................. 65/134.4, 134.1, 65/157, 346, 347; 432/196

[56] References Cited

U.S. PATENT DOCUMENTS

| | | | |
|---|---|---|---|
| 4,424,071 | 1/1984 | Steitz et al. | 65/136 X |
| 4,708,728 | 11/1987 | Desprez et al. | 65/136 |
| 4,725,299 | 2/1988 | Khinkis et al. | 65/134 |
| 4,909,733 | 3/1990 | Yab | 432/196 |
| 5,147,438 | 9/1992 | Castelain et al. | 65/135 |
| 5,346,524 | 9/1994 | Shamp | 65/134.4 |

*Primary Examiner*—John Hoffmann
*Attorney, Agent, or Firm*—Cornelius P. Quinn

[57] ABSTRACT

An oxygen-fuel firing system for a furnace comprising separate, spread apart nozzles for introducing gaseous streams of oxygen and fuel into the furnace at spaced apart locations. The gaseous streams merge within the furnace away from the furnace walls and crown. Thus, the main combustion within the furnace takes place in the central portion of the furnace where a broad flame cloud is created. The broad flame cloud provides a more uniform temperature profile within the furnace for a more efficient processing of materials being melted in the furnace.

17 Claims, 4 Drawing Sheets

OXYGEN/FUEL FIRED FURNACES HAVING MASSIVE, LOW VELOCITY, TURBULENT FLAME CLOUDS

This application is a continuation-in-part of application Ser. No. 08/167,752, filed Dec. 15, 1993 now abandoned which application was a division of application Ser. No. 08/015,491, filed Feb. 9, 1993 and which issued on Sep. 13, 1994 as U.S. Pat. No. 5,346,524, which application was a continuation-in-part of application Ser. No. 07/944,551, filed Sep. 14, 1992, since abandoned, all applications being, entitled OXYGEN/FUEL FIRING OF FURNACES WITH MASSIVE, LOW VELOCITY, TURBULENT FLAMES.

FIELD OF THE INVENTION

This invention relates to apparatus and a method of heating furnaces to melt and refine materials, such as glass, using oxy-fuel firing, sometimes called 100% oxygen (or oxy)-fuel firing, but with a new, unique firing system.

BACKGROUND OF THE INVENTION

Regenerative furnaces have been the workhorse for fuel fired melting of materials such as glass. Recuperative furnaces are also commonly used. Regenerative and recuperative furnaces use hot air preheated with hot exhaust gases to mix with fuel for combustion to provide the heat energy and temperature needed in the furnaces. It has become common practice to supplement the hot air with some oxygen to compensate for a damaged regenerative stove or recuperator or to modify the flame shape as disclosed in U.S. Pat. No. 4,725,299 and European patent application 0,335,728. Another way of oxygen boosting regenerative melters is to mount and fire oxy-fuel burners, of the type described in the next paragraph, in the furnace in addition to the normal hot air port firing as disclosed in U.S. Pat. No. 5,147,438. All of these furnaces, however, continue to rely on large quantities of hot air containing over 70% nitrogen for firing which produces emission problems and heat recovery equipment capital and operating cost and maintenance problems, and also problems caused by excessive refractory temperatures.

In the firing of furnaces using relative pure oxygen, at least 75% oxygen, as the oxidant for a gaseous or liquid fuel it is known to use various kinds of burners to achieve the desired result as described in U.S. Pat. Nos. 3,592,622, 4,376,205, 4,531,960, 4,541,796, 4,622,007, 4,642,047, 4,690,635, 4,761,132, 4,986,748, 5,145,361, 5,147,438, 5,199,366, and Combustion Tec, Inc's Cleanfire (trademark) burner. All of these burners introduce the oxygen into a burner block in the wall of a furnace or into the furnace in close proximity to the fuel stream creating an intense flame of concentrated energy in the furnace. When several of these burners are placed in a furnace wall in spaced apart arrangement and fired, a plurality of intense flames are created with relatively cooler spaces between the flame boundaries. This condition, though improved over previous air-fuel firing technology for applications such as glass melting, still leaves room for improvement in temperature uniformity of the furnace and the work product in the furnace and in reducing refractory wall temperatures.

BRIEF SUMMARY OF THE INVENTION

The present invention relates to a new and improved furnace firing system and method of firing a furnace. While the invention is applicable to a broad range of furnaces, it is particularly applicable to furnaces used for melting processes such as glass melting processes.

In the present invention conventional oxy-fuel burners, of the prior art type disclosed above and as described later in this paragraph, are not used. Instead oxygen streams are introduced into the furnace, said furnace having at least one wall and a roof, through one or more of the walls and/or the roof of the furnace at locations separately and spaced apart from locations where streams of fuel such as propane or natural gas are introduced into the furnace through nozzles or pipes. By spacing the oxygen and fuel streams apart such that the oxygen does not contact the natural gas in enough concentration to generate substantial combustion until the gases are a safe distance from the wall or crown of the furnace. This keeps the furnace refractories cooler than the prior art oxy-fuel fired furnaces where combustion begins close to the wall or in a burner block. Preferably the streams or nozzles are spaced at least six inches apart and usually at least ten inches apart in the walls and/or roof.

Nozzles for the fuel and oxygen are placed and controlled to generate a cloud of flame in the furnace that covers more area of the work product or fills more volume of the furnace than the flames coming from air-fuel or oxy-fuel burner systems previously used in furnaces. A flame cloud, as used herein, means a three dimensional dynamic mass of flame that is changing slightly in dimensions and volume, but is fairly uniform in density. Preferably each stream of fuel is adjacent at least one stream of oxygen and each stream of oxygen is adjacent at least one stream of fuel. While many combinations are workable, the most preferred arrangement for generating a uniform temperature cloud of flame is to position an oxygen nozzle substantially, preferably essentially, opposite a fuel nozzle such that the stream of oxygen collides continuously with a stream of fuel in the center portion of the furnace, and repeating this arrangement with other pairs of nozzles to achieve the flame cloud pattern desired. Also, the rate of fuel and oxygen flow to each pair of nozzles or injectors can be regulated to produce the desired temperature profile in the furnace.

This invention is particularly useful in a furnace for melting glass precursor materials intentionally using only oxygen, commercial grades of oxygen such as preferably a gas containing at least 75% oxygen, or oxygen with some air but containing at least about 75% oxygen in one set of nozzles and a fuel such as a natural gas, propane, and vaporized or atomized fuel oil in the other set of nozzles, the furnace containing no conventional oxy-fuel burners, i.e. burners which bring the oxidant and fuel into or out of the wall in either a mixture or in close proximity such that a very hot flame develops either in a burner block in the furnace wall or very close to the wall such that in either case the wall becomes undesirably hot due to the close proximity of the very hot oxy-fuel flame temperature.

Preferably all of the nozzles are located within a few inches of a common plane, usually but not necessarily a horizontal or vertical plane. Such a furnace, according to the present invention, is distinctly different than the oxygen boosted air-fuel fired furnaces of the prior art such as disclosed in European patent application 0,335,728 and U.S. Pat. Nos. 4,725,299 and 5,147,438. In these types of prior art regenerative furnaces air, preheated in a regenerator, is fed to the furnace through relatively large openings called ports in the side walls or an end wall. Fuel is injected into these preheated air streams either prior to passing into the furnace or immediately thereafter. The nozzles used to inject the fuel are sometimes referred to as burners, but they are unlike true burners because they handle only fuel and not also an oxidant like normal burners. Sometimes oxygen is injected into the preheated air or furnace to make up for subperformance of a regenerator or to boost the amount of heat energy entering the furnace, but this is quite different than the present invention since air, usually preheated, remains the primary oxidant. The oxygen content of the primary oxidant in these prior art teachings is substantially below 75% whereas oxygen is the primary oxidant in the present invention with any air present being only due to leakage or as a contaminant in the oxygen to optimize oxygen cost. This is the difference between an oxygen boosted furnace and an oxy-fuel or a 100% oxy-fuel fired furnace as is the present invention.

Regenerators, including the attendant wall ports which are very large compared to the oxidant nozzles of the present invention, or recuperators, and all of the costs and headaches these air preheat equipment bring to the furnace, are unnecessary on the present invention and, unlike an oxygen boosted furnace, are not used on oxy-fuel fired furnaces, or the new type of oxy-fuel fired or 100% oxy-fuel fired furnace which is the present invention.

DETAILED DESCRIPTION OF THE INVENTION

Figure 1:
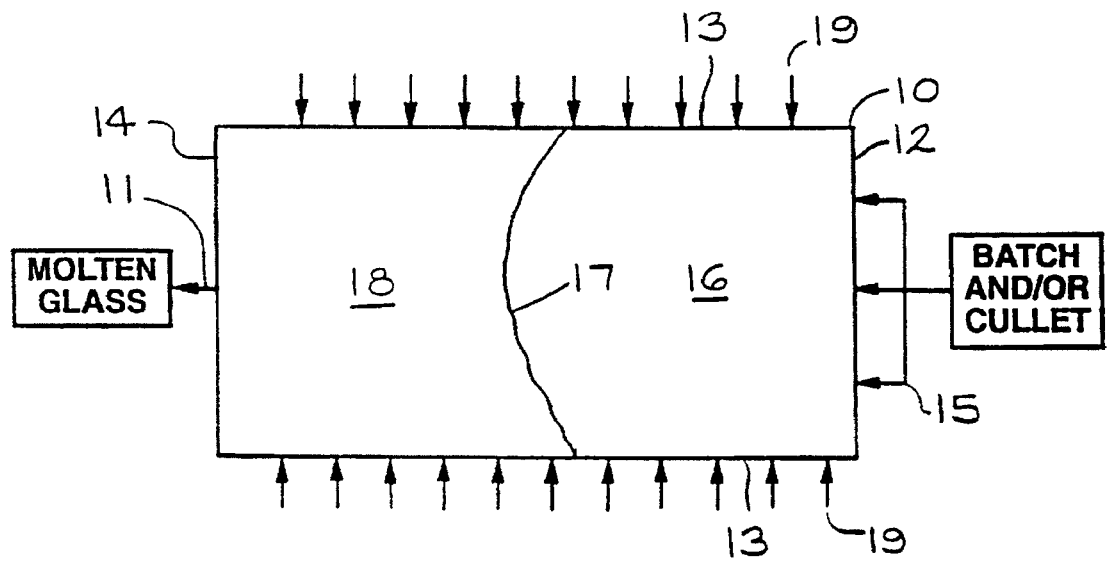
FIG. 1 is a plan view of a prior art furnace for melting glass.

FIG. 1 provides a greatly simplified plan view of a prior art unit furnace 10 set up to melt glass. The rectangular furnace 10 is made up of a back wall 12, two side walls 13, a front wall 14, and a conventional crown and bottom that are not shown. All of the walls are constructed of refractories in a conventional manner. Burners 19 using fuel such as natural gas and either air or oxygen, are located in the sidewalls 13 and are fired to provide the heat needed to melt glass forming materials and to refine the resultant molten glass so that it can be formed into desired products. Batch materials 15 are metered into the furnace 10 through two or more openings in the back wall 12 in a known manner to form a batch cover 16 which moves down the length of the furnace 10 while gradually melting until the last of the unmelted material disappears at a batch line 17. Molten glass 18 continues to move down the length of the furnace becoming more homogeneous and free of gaseous bubbles or seeds and is discharged through a throat 11 in the front wall 14 into a forehearth or feeder (not shown) which conditions the glass to the desired temperature and delivers it to forming equipment.

In this prior art furnace the burners 9 can be fed with premixed fuel and air, separate streams of fuel and air or separate streams of fuel and oxygen. The use of relatively pure oxygen instead of air is becoming very popular because it is more energy efficient and environmentally desirable. Air contains about 79% nitrogen which does not contribute to the combustion reaction. Instead the nitrogen soaks up a lot of energy and greatly increases the volume of exhaust gases that must be handled. Also, the nitrogen tends to form nitrogen oxides which are undesirable and very costly to remove. Because of these problems resulting from the use of air fired burners, the industry has begun to use relatively pure oxygen to replace much or all of the air and this trend will accelerate as the net cost of using oxygen continues to decline.

Figure 2:
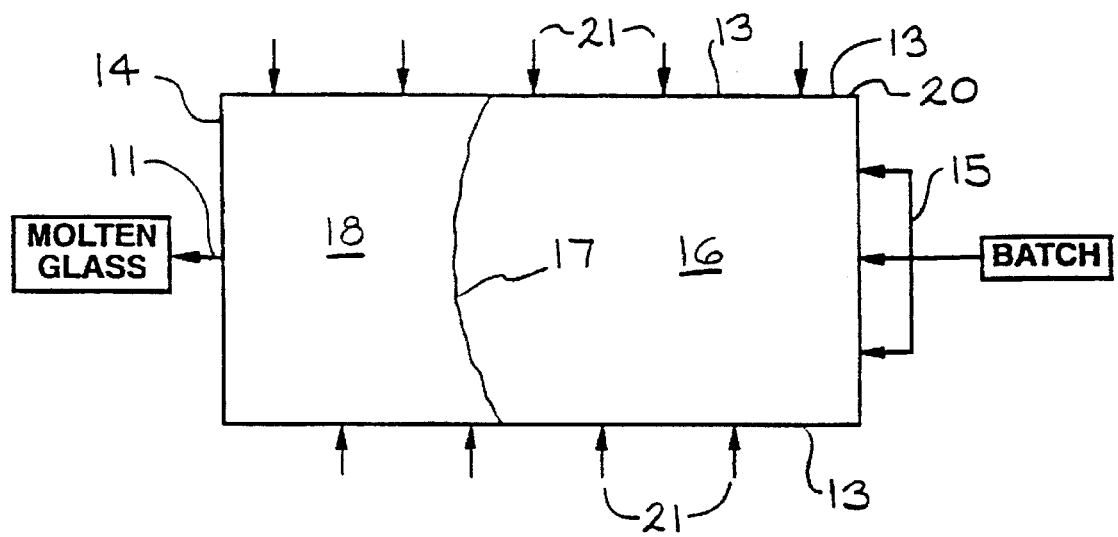
FIG. 2 is a plan view of a similar glass melting furnace, but using oxy-fuel burners.

FIG. 2 shows a glass tank 20 similar to that shown in FIG. 1, but converted to 100% oxy-fuel burners 21 in place of the larger number of air-fuel burners 19 shown in FIG. 1. For ease of reference corresponding features of the two furnaces are given like reference numerals. The oxy-fuel burners 21 and flow controls for each burner are very expensive. For this reason and because the flame temperature of an oxy-fuel burner is much higher than that of an air-fuel burner, it is known practice to reduce the number of burners when using oxy-fuel burners by spacing the oxy-fuel burners wider apart than the air-fuel burners. One reason that the oxy-fuel burners are more expensive than air-fuel burners is the necessity of keeping the fuel stream separated from the oxygen stream until the gases clear the end of the burner and preferably until the gases are close to or beyond the inside of the sidewalls 13. This prevents combustion from taking place inside the burner or wall which can seriously damage the burner and the sidewall.

While oxy-fuel firing offers many advantages over air-fuel firing there are still a few features needing improvement. One is the high cost of the burners and the risk that a burner malfunction or defect could not only ruin the burner, but also cause costly damage to the furnace sidewalls. Also, there is a significant variation in the temperature of the atmosphere above the glass which causes a variation in the molten glass surface temperature. This occurs because the flame temperature of any oxy-fuel flame exceeds 5000 degrees Fahrenheit, the burners are spaced farther apart then the air-fuel burners, the radiation from the flame decreases by the square of the distance from the radiation source and the flame pattern coming from an oxy-fuel burner is generally cylindrical in shape approaching a gradually expanding frustum. Thus, there are substantial areas in the furnace between the hot flame patterns that are significantly cooler than the flame patterns.

The present invention overcomes these shortcomings by using inexpensive gas nozzles in a unique way to create a cloud of flame that applies the heat energy in a more uniform way to the work product. Since each nozzle contains only an oxidant or only a fuel, there is no danger of premature combustion and the damaging and dangerous situations which can result from premature combustion.

Figure 3:
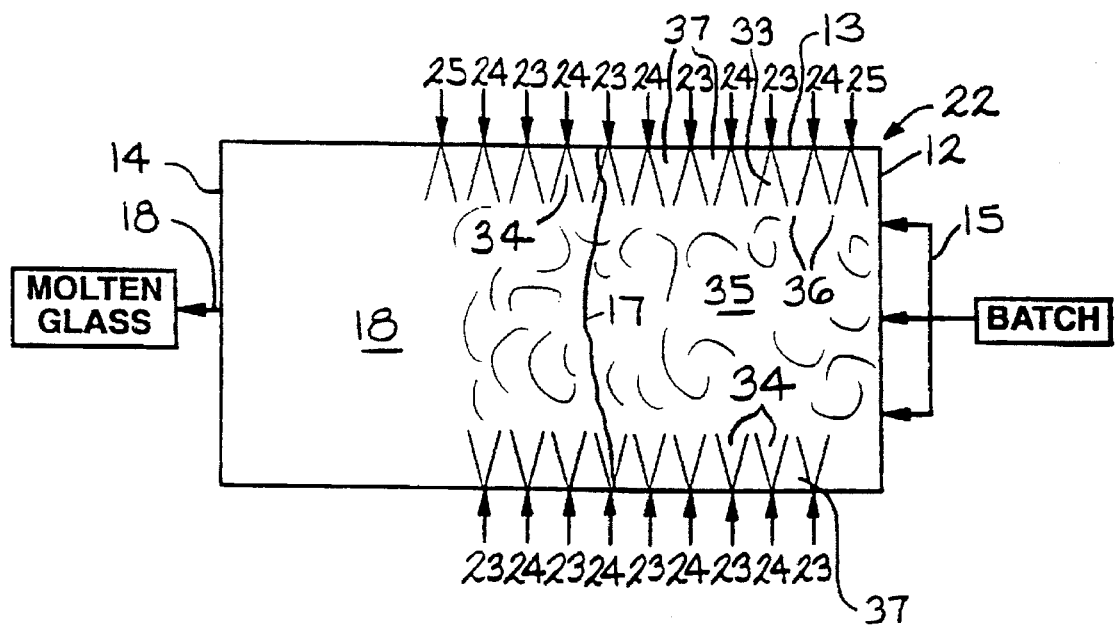
FIG. 3 is a plan view of a glass melting furnace according to a preferred embodiment of the invention.

FIG. 3 shows a preferred embodiment of the present invention used in a glass tank 22 to prepare molten glass. This tank or furnace 22 is identical to the furnaces shown in FIGS. 1 and 2, except the conventional burners 9 and 21 are not used. Instead burners 9 and 21 are replaced with relatively closely spaced nozzles or pipes 23, 24 and 25. The nozzles 23, 24 and 25 are usually spaced at least 10 inches apart and can be up to several feet apart. The spacing of the nozzles is selected to produce a flame cloud or flame blanket that covers at least 50%, preferably 70% and most preferably at least 80% of the top surface of the batch and molten glass in the portion of the furnace 22 containing the nozzles 23, 24 and 25.

Figure 4:
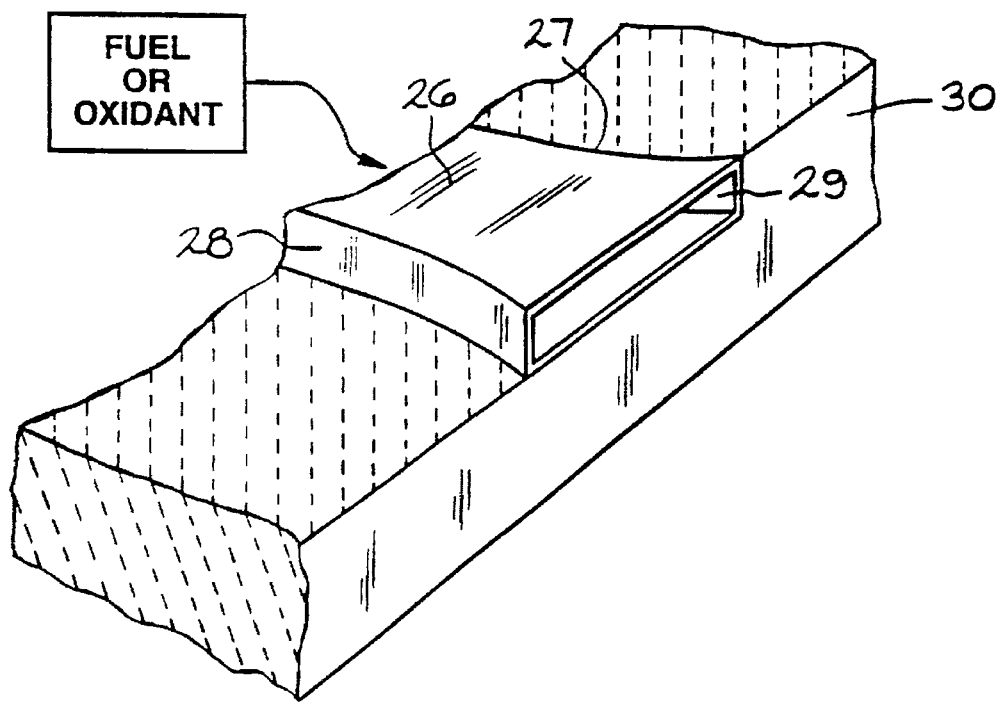
FIGS. 4 and 5 show preferred nozzles used to inject the oxygen and gaseous fuel into the furnace in the embodiment shown in FIG. 3.
Figure 5:
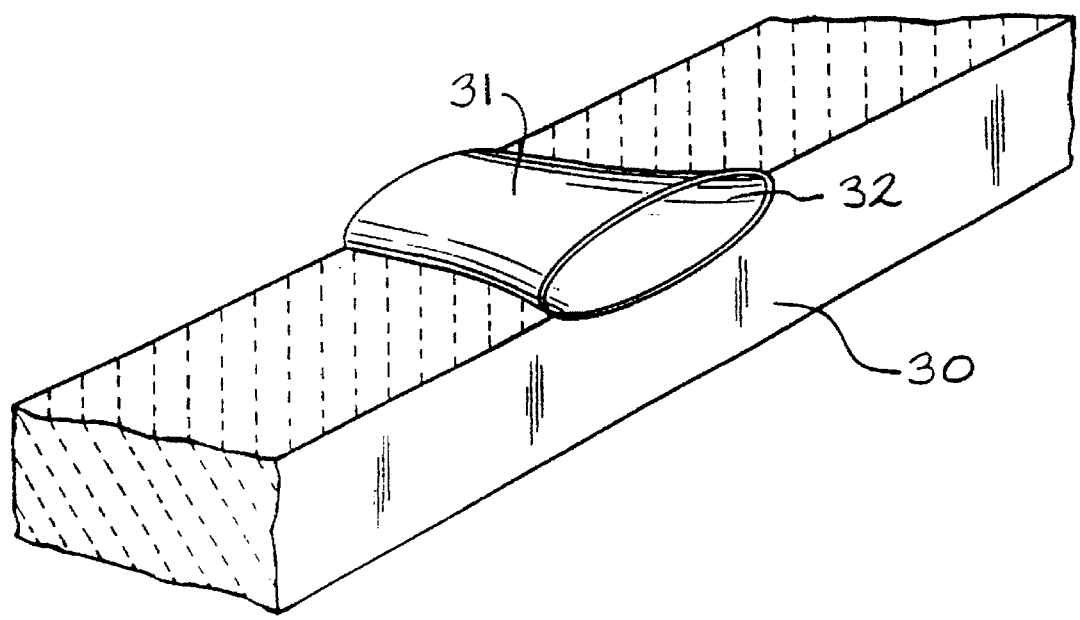

The nozzles 23, 24 and 25 can be merely lengths of pipe, preferably made of stainless steel or other refractory metals to resist higher temperature oxidation and corrosion, but preferably the nozzles 23, 24 and 25 are shaped as shown in FIGS. 4 and 5. FIG. 4 shows a cutaway of a portion of a refractory sidewall in a glass tank. A nozzle 26 having two sides 27, 28 and an exit end 29 is located in the sidewall with the exit end 29 of the nozzle flush with, or recessed in, the interior surface 30 of the sidewall. The entrance end of the nozzle 26 is not shown but can be round if desired to make it easily attachable to a supply pipe segment. The shape of the exit end 29 of the nozzle 26 causes the exhausting fuel or oxidant to form a fan shaped stream of gas that spreads out in a horizontal plane as it moves away from the nozzle exit 29, but spreads or grows very little in the vertical dimension. As the alternate fans or streams of fuel and oxidant contact one another combustion takes place producing a cloud of flame just above the surface of the batch cover or molten glass maximizing the radiant energy transfer to the work product and minimizing the amount of radiant energy transfer to the refractory crown of the furnace. The distance between the molten glass pool and the bottom of the nozzles should be at least 2–12 inches.

Another nozzle embodiment which can be used for nozzles 23, 24 and 25 is shown in FIG. 5. This nozzle 31 has an exit end 32 in the form of an elongated ellipse. Other nozzle shapes suitable for the described purposes will be apparent to those skilled in the art.

Referring again to FIG. 3, the nozzles 23 are used to inject industrial grade oxygen streams 33 into the melter and the nozzles 24 are used to inject natural gas or propane streams 34 into the melter. Atomized or vaporized fuel oil or other known gaseous fuels can also be used in the nozzles 24. Nozzles 25 are optional and are used to inject oxygen so that each stream of gaseous fuel will have an oxygen stream on each side to insure complete combustion within the resultant cloud of flame. Note that in this preferred embodiment each gaseous fuel nozzle 24 in each sidewall 13 is opposed, or essentially opposed, by an oxygen nozzle 23 in the opposite sidewall 13. This results in a good final mixing of the opposed streams in the center portion of the furnace forming the cloud of flame 35. In this embodiment the walls 13 do not become overheated because the streams of gases passing through the nozzles 23, 24 and 25 have a cooling effect and because the streams 33 and 34 do not contact each other or mix until they are a significant distance 36 from the working surface of the walls 13. It is preferred that these stream intersecting points or regions 36 be at least 12 inches from the interior of the sidewalls 3. This delayed combustion in a hot atmosphere will cause the fuel in the fuel streams to decompose or crack forming volatiles and very small carbon particles which combust at a slower rate than normal fuels thereby producing a more luminous flame cloud. This increased luminosity increases the radiation transfer efficiency with molten glass and glass coated glass batch. Very little combustion or flames exist in the regions 37 of the furnace 22 adjacent the walls 13. The lack of significant combustion adjacent the sidewalls together with the location of the nozzles in close proximity to the glass line and the nozzle design which creates narrow fan shaped gas streams with small vertical dimension cooperate to keep the refractory walls and crown much cooler than the hottest portions of prior art oxy-fuel furnaces.

In the preferred mode of the present invention, the nozzles 23, 24 and 25 extend only about one-half to two-thirds along the length of the sidewalls 13 beginning at the backwall 12. This locates the flame cloud 35 above the melting batch and just beyond the batch line 17 where the most energy is needed. The molten glass 18 needs time to cool somewhat, degas, and homogenize as it moves beyond the flame cloud and towards the exit throat in the front wall 14.

In operation, the amounts of oxygen and gaseous fuel supplied to the nozzles are controlled to produce the desired temperature in the furnace and to produce a stoichiometric condition in the combustion or slightly excess oxygen in the combustion. The flow of gases to each set of opposed or essentially opposed nozzles can be controlled and varied to produce a desired temperature profile along the length of the flame cloud 35. The flow controls for the nozzles 23, 24 and 25 in this invention are conventional gas flow controls which are much less expensive than the flow controls on conventional oxy-fuel burners where each burner requires flow controls for both oxygen and natural gas.

Another application for this invention is in molten glass refining and forming zones or forehearths of the furnace, such as shown in U.S. Pat. No. 4,375,369, which patent is herein incorporated by reference. Refractory lined channels transport the molten glass, while refining and conditioning it to the desired temperature, to a multiplicity of forming equipment to make glass articles such as glass fibers, bottles, etc. Due to heat losses in these channels and forehearths it has been necessary in the past to install burners to control the temperature of the glass. Because maintaining a uniform glass temperature is super critical, it has been common practice to install many small burners to get more flame cover. Piping gas and air to each small burner has been very expensive and often an air/gas mixing system requiring expensive safeguards to prevent backfiring has been necessary. Such systems have not only been expensive but required careful maintenance to prevent explosions and damaging premature ignition and these problems are greatly multiplied when using oxygen or oxygen enriched air instead of air as the oxidant.

Figure 6:
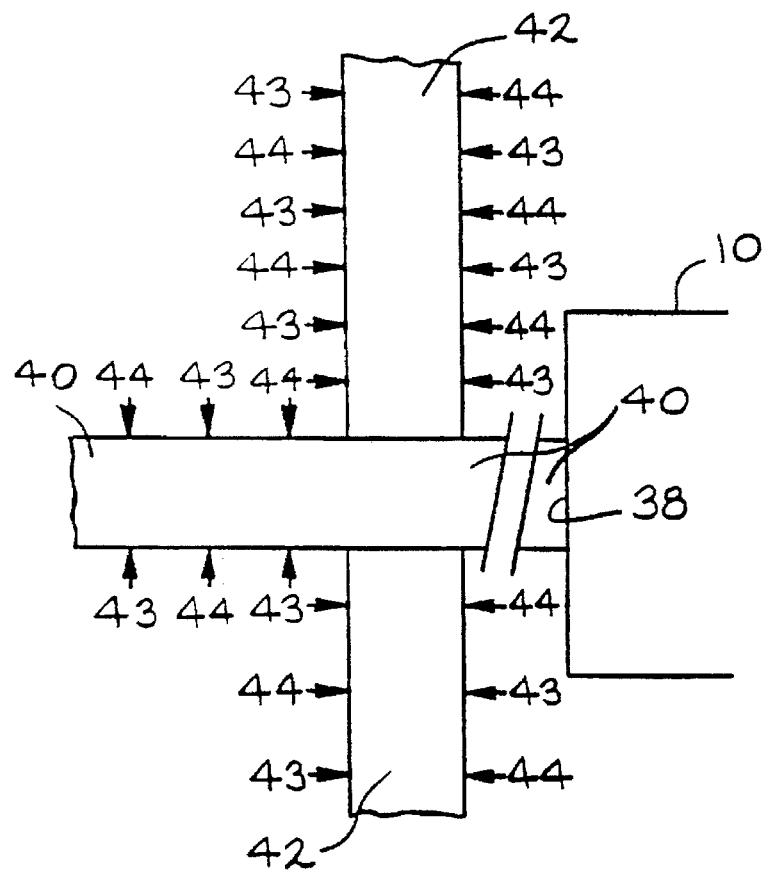
FIG. 6 is a plan view of a portion of a refining channel and bushing feeder utilizing the firing system of the present invention.

FIG. 6 illustrates the application of the present invention on such a forehearth channel and fiber forming feeder channels. Molten glass exits the furnace 10 through a submerged throat 38 and flows down a forehearth channel 40. The channel 40 has a multiplicity of fiber forming feeder channels 42 connected thereto. Pipes or nozzles are installed in the walls of these channels 40 and 42 just above the maximum glass level in the manner previously shown for the glass melter of FIG. 13. Every other nozzle 44 along the channels 40 and 42 feeds industrial grade oxygen or an oxygen/air mixture having at least 75% oxygen, preferably at least 80% oxygen, and most preferably at least 90% oxygen into the channel, and the nozzles therebetween 43 supply a gaseous fuel to the channels. This arrangement produces a flame cloud that covers a larger percentage of the molten glass with less nozzles than the flames from prior art burner systems. Note that each oxygen nozzle 44 is opposed, or substantially opposed, on the opposite channel wall by a fuel nozzle 43. This is the preferred nozzle orientation. If desired, the channels can be divided into zones and the nozzles in a zone combined with a common flow controller for oxygen and a common flow controller for fuel.

Figure 7:
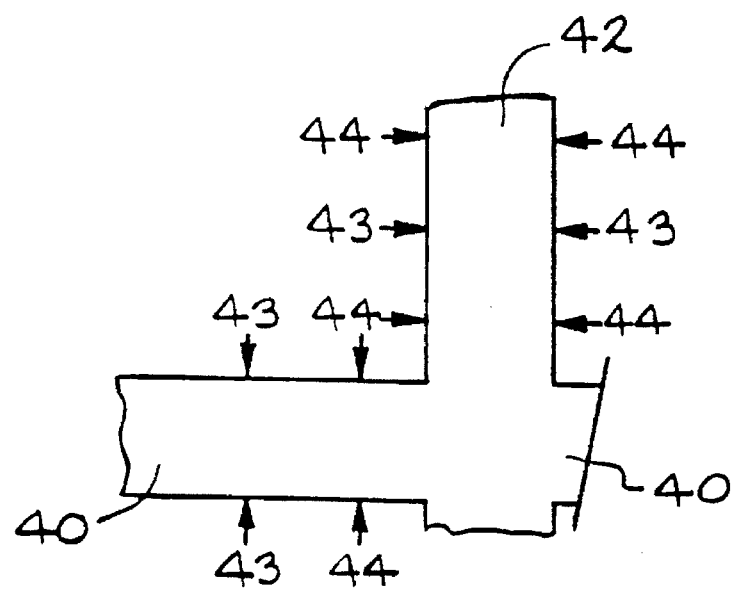
FIGS. 7 and 8 are partial plan views of modifications of the system shown in FIG. 6.
Figure 8:
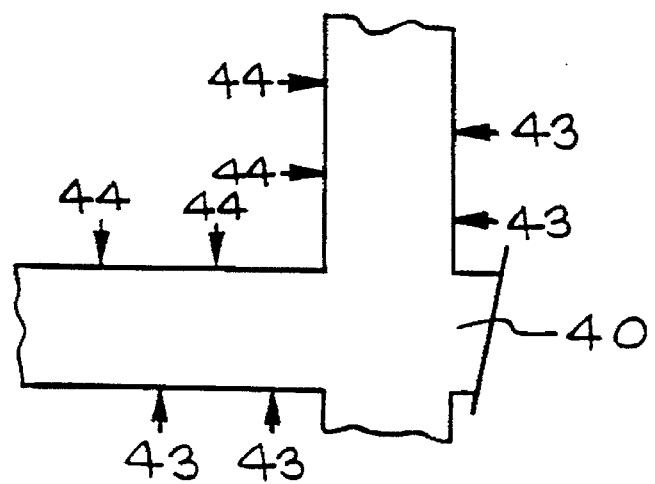

FIGS. 7 and 8 illustrate other embodiments of the invention. In these embodiments the oxygen nozzles 44 are not substantially opposed by a fuel nozzle 43 on the opposite wall. In FIG. 7 each oxygen nozzle 44 is opposed by another oxygen nozzle 44 and each fuel nozzle 43 is likewise opposed by another fuel nozzle 43. Each fuel nozzle 43 has at least one adjacent oxygen nozzle 44. In FIG. 8 none of the nozzles are substantially opposed to another nozzle on the opposite wall, but instead the nozzles are offset from one another.

In each of the embodiments shown, it is important that the nozzles be spaced apart at least ten inches, preferably at least twelve inches and most preferably at least sixteen inches when located in a common wall. In the case of a very small furnace, like a laboratory furnace, including small forehearths and narrow channels for forming equipment, like fiberizing bushings, very small nozzles are used and in these instances it may be desirable to space the nozzles as close as on six inch centers, still much further apart than the oxidant and fuel would be in burners currently used in these types of small furnaces. Preferably, all of the nozzles located on a common wall line up in a horizontal plane or are at most within a few inches of a common horizontal plane.

What is claimed is:

1. A 100 percent oxygen-fuel fired furnace for heating a material contained therein using only an oxidant containing at least about 75 percent oxygen and a fuel to supply combustion in the furnace, said furnace having no regenerative ports and no oxy-fuel burners, burners that introduce oxygen into the furnace in proximity to a fuel stream causing combustion to begin within a burner block within a wall of the furnace or to begin close to a wall of the furnace, said furnace having at least one wall and a roof, and having at least three nozzles located in the at least one wall or the roof of said furnace for directing streams of the oxidant and at least one stream of the fuel separately into said furnace, there being at least one oxidant nozzle for each fuel nozzle, said each fuel nozzle being spaced from each oxidant nozzle by at least about ten inches, said nozzles being shaped such that the oxidant and fuel streams do not mix enough to generate substantial combustion until said streams are such a distance from the at least one wall or roof in which said nozzles are located to keep said at least one wall or roof cooler than if the oxygen and fuel streams were fed into the furnace with said oxy-fuel burners.

2. The furnace of claim 1 wherein said nozzles are lined up within a few inches of a common plane.

3. The furnace of claim 2 wherein said oxidant contains at least about 90 percent oxygen.

4. The furnace of claim 1 wherein said furnace is a glass furnace and said nozzles are located such that their bottom edges are about 2–12 inches above a top surface of molten glass in said furnace.

5. The furnace of claim 1 wherein said nozzles are shaped and positioned to emit streams of oxidant and at least one stream of fuel from ends of said nozzles that spread out substantially in the horizontal dimension, but spread very little in the vertical dimension, as said streams move away from said ends of said nozzles.

6. The furnace of any one of claims 1–5 wherein said furnace is or is a forehearth or a channel for feeding forming equipment and wherein said each fuel nozzle is spaced from said oxidant nozzles by at least six inches.

7. The furnace of claim 1 wherein said each fuel nozzle is next to two of said oxidant nozzles.

8. The furnace of any one of claims 2–5, 7 wherein said each fuel nozzle is substantially opposed by an oxidant nozzle located in an opposite wall of the furnace.

9. The furnace of claim 1 wherein said each fuel nozzle is substantially opposed by an oxidant nozzle located in a wall opposite said at least one wall of the furnace.

10. The furnace of any one of claims 1–5, 7, 9 wherein said nozzles are shaped and spaced such that a flame cloud covers at least about 80 percent of a segment of said furnace beneath an area bounded by the nozzles in said furnace.

11. The furnace of claim 1 wherein nozzles are also located in a wall opposite said at least one wall and said nozzles are spaced such that centerline projections from the nozzles in one wall strike the opposite wall at points spaced from the nozzles in said opposite wall.

12. A 100 percent oxygen-fuel fired furnace for heating a material contained therein, using only an oxidant containing at least about 75 percent oxygen and a fuel to supply combustion in the furnace, said furnace having no regenerative ports and no oxy-fuel burners, burners that introduce oxygen into the furnace in proximity to a fuel stream causing combustion to begin within a burner block within a wall or to begin close to said wall of the furnace, said furnace having at least one wall and a roof, and having oxidant nozzles and at least one fuel nozzle located in the at least one wall or the roof of said furnace for directing streams of the oxidant and streams of the fuel separately into said furnace, said nozzles being shaped such that the oxidant and the fuel streams do not mix enough to generate substantial combustion until said streams are such a distance from said wall or said roof in which said nozzles are located to keep said wall or roof cooler than if the oxygen and fuel streams were fed into the furnace with said oxy-fuel burners.

13. The furnace of claim 12 wherein the oxidant contains at least about 90 percent oxygen.

14. The furnace of claim 12 wherein said at least one fuel nozzle is next to at least one oxidant nozzle.

15. The furnace of claim 12 wherein each fuel nozzle is substantially opposed by an oxidant nozzle located in a wall opposite said at least one wall of the furnace.

16. The furnace of claim 12 wherein said nozzles are located in said at least one wall and in a second wall opposite said at least one wall and are spaced such that centerline projections from the nozzles in said at least one wall strike the opposite wall at points spaced from nozzles in said opposite wall.

17. The furnace of claim 12 wherein said furnace is a furnace for making molten glass.

* * * * *